United States Patent
Strasser

(10) Patent No.: US 9,162,575 B2
(45) Date of Patent: Oct. 20, 2015

(54) DEVICE FOR DISPLAYING INFORMATION IN A HYBRID VEHICLE

(71) Applicant: AUDI AG, Ingolstadt (DE)

(72) Inventor: Roman Strasser, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/371,943

(22) PCT Filed: Dec. 19, 2012

(86) PCT No.: PCT/EP2012/005247
§ 371 (c)(1),
(2) Date: Jul. 11, 2014

(87) PCT Pub. No.: WO2013/104401
PCT Pub. Date: Jul. 18, 2013

(65) Prior Publication Data
US 2015/0009024 A1 Jan. 8, 2015

(30) Foreign Application Priority Data
Jan. 13, 2012 (DE) .......... 10 2012 000 584

(51) Int. Cl.
*B60Q 1/00* (2006.01)
*B60K 37/02* (2006.01)
(Continued)

(52) U.S. Cl.
CPC .......... *B60K 37/02* (2013.01); *B60W 50/14* (2013.01); *G01D 7/04* (2013.01); *B60K 2350/1064* (2013.01); *B60K 2350/1076* (2013.01);
(Continued)

(58) Field of Classification Search
CPC .......... B60K 37/02; B60K 2350/1064; B60K 2350/1092; B60K 2350/203; B60K 2350/2008; B60K 2350/1076; B60W 50/14; B60W 2050/146

USPC .......... 340/439, 438, 441, 455, 458, 459, 461, 340/425.5, 815.4, 815.45; 701/22, 114, 701/432; 180/65.29, 65.21; 345/7, 9, 634; 362/23.01; 116/62.3, 286
See application file for complete search history.

(56) References Cited

U.S. PATENT DOCUMENTS

| 4,623,870 | A | 11/1986 | Irimajiri et al. |
| 7,898,405 | B2 * | 3/2011 | Burke et al. .......... 340/461 |

(Continued)

FOREIGN PATENT DOCUMENTS

| DE | 78 19 113 U1 | 2/1979 |
| DE | 3 237 407 A1 | 4/1983 |

(Continued)

OTHER PUBLICATIONS

Office Action issued Sep. 12, 2012 for corresponding German Patent Application No. 10 2012 000 584.9.
(Continued)

*Primary Examiner* — Anh V La
(74) *Attorney, Agent, or Firm* — Staas & Halsey LLP

(57) ABSTRACT

A device for displaying information in a hybrid vehicle comprises a display instrument that has multiple zones for displaying the current operating state of a combustion engine and of at least one electric motor in the hybrid vehicle. The power that the at least one electric motor can generate in a boost mode can be displayed in one of the zones. The display instrument includes a zone that can display the remaining time during which the at least one electric motor can be operated in the boost mode.

20 Claims, 2 Drawing Sheets

(51) Int. Cl.
*G01D 7/04* (2006.01)
*B60W 50/14* (2012.01)

(52) U.S. Cl.
CPC ... *B60K2350/1092* (2013.01); *B60K 2350/203* (2013.01); *B60K 2350/2008* (2013.01); *B60W 2050/146* (2013.01)

(56) References Cited

U.S. PATENT DOCUMENTS

2002/0186228 A1* 12/2002 Kobayashi et al. ........... 345/633
2009/0125173 A1* 5/2009 Komatsu et al. ................ 701/22
2010/0106351 A1* 4/2010 Hanssen et al. ................ 701/22

FOREIGN PATENT DOCUMENTS

| DE | 4 325 721 A1 | 2/1995 |
|---|---|---|
| DE | 19 533 829 C1 | 9/1996 |
| DE | 10 2005 036 007 A1 | 2/2007 |
| DE | 10 2006 017 634 A1 | 10/2007 |
| DE | 10 2007 030 524 A1 | 12/2008 |
| DE | 10 2007 057 548 A1 | 6/2009 |
| DE | 10 2009 021 456 A1 | 11/2010 |
| DE | 10 2010 047 980 A1 | 6/2011 |
| DE | 10 2010 010 443 A1 | 8/2011 |
| DE | 10 2012 000 584.9 | 1/2012 |
| WO | PCT/EP2012/005247 | 12/2012 |

OTHER PUBLICATIONS

International Search Report mailed Jul. 9, 2013 for corresponding International Patent Application No. PCT/EP2012/005247.
WIPO provided English translation of the International Preliminary Report on Patentability mailed Jul. 17, 2014 for corresponding International Patent Application No. PCT/EP2012/005247.

* cited by examiner

DEVICE FOR DISPLAYING INFORMATION IN A HYBRID VEHICLE

CROSS REFERENCE TO RELATED APPLICATIONS

This application is based on and hereby claims priority to International Application No. PCT/EP2012/005247 filed on Dec. 19, 2012 and German Application No. 10 201 2 000 584.9 filed on Jan. 13, 2012, the contents of which are hereby incorporated by reference.

BACKGROUND

The invention relates to a device for displaying information in a hybrid vehicle, having a display instrument.

A device of the generic type is known from DE 195 33 829 C1. The display instrument here has a plurality of variable zone markings which can shift, for example, when the temperature of the battery supplying the electric motor with current changes.

The electric motor of a hybrid vehicle can be operated in a manner known per se in what is referred to as a boost mode in which the actual rated power is briefly exceeded. Such boosting can be used, for example, during an overtaking maneuver and can be triggered, for example, by a kickdown, that is to say complete depression of the gas pedal during which the maximum power of the drive is called. An example of such a boost mode is given in DE 10 2009 021 456 A1.

DE 10 2010 010 443 A1 describes a display device of a motor vehicle, in which device an available duration of boost of an electric motor of the motor vehicle is displayed in a central zone of a display field.

A further display device for a motor vehicle is described in DE 10 2007 030 524 A1. This presents a pointer which additionally signals the lack of driving capability in a first position and the driving capability in a second position.

SUMMARY

One possible object is to provide a device for displaying information in a hybrid vehicle, which device provides the driver of the vehicle with better feedback about the current and expected operating state of the drive source of the hybrid vehicle.

The inventor proposes device for displaying information in a hybrid vehicle having a display instrument which has multiple zones for displaying the current operating state of an internal combustion engine and of at least one electric motor of the hybrid vehicle, wherein the power which can be produced in one of the zones in a boost mode of the at least one electric motor can be displayed. According to this proposal, the display instrument has a zone in which it is possible to display the remaining time in which the at least one electric motor can be operated in the boost mode, and in that the zone in which the remaining time can be displayed is in the zone in which the power of the electric motor which can be produced in the boost mode can be displayed As a result of the proposed zone of the display instrument in which it is possible to display the remaining time in which the at least one electric motor can be operated in the boost mode, the driver of the hybrid vehicle is provided with information as to how long the boost mode can still be maintained, and he can therefore orient his driving style correspondingly. For example, this information may be useful to decide whether an overtaking maneuver can still be carried out or not or whether an overtaking maneuver which has already started can be continued to the end or has to be aborted. As a result, the device contributes considerably to increasing the safety in road traffic.

As a result of the fact that the zone in which the remaining time can be displayed is in the zone in which the power of the electric motor which can be produced in the boost mode can be displayed, no additional surfaces have to be provided on the display instrument, as a result of which the latter can maintain its original size.

The inventor also proposes a device for displaying information in a hybrid vehicle having a display instrument which has multiple zones for displaying the current operating state of an internal combustion engine and of at least one electric motor of the hybrid vehicle. The power which can be produced by the at least one electric motor in a boost mode can be displayed in one of the zones. According to this proposal, the display instrument has a zone in which it is possible to display the remaining time in which the at least one electric motor can be operated in the boost mode, and in that the zone in which the remaining time can be displayed is arranged essentially parallel to the zone in which the power which can be produced by the electric motor in the boost mode can be displayed An advantageous development relates to the fact that the power of the electric motor which can be produced in the boost mode can be displayed by a pointer, and the remaining time can be displayed by at least one light element. Such combined display by a pointer and a light element is very clear and can therefore be read very easily by the driver.

Alternatively, it is possible to provide that the power of the electric motor which can be produced in the boost mode can be displayed by a light element in one direction, and the remaining time can be displayed in another direction of the zone. Such a two-dimensional display of the boost mode can be very clear and can therefore have corresponding advantages.

A further advantageous refinement can relates to the fact that the power which can be produced in the boost mode of the electric motor can be displayed as a function of a temperature of a battery which is connected to the electric motor. In this way, the driver of the hybrid vehicle which is equipped with the device receives information about the power which can actually be produced by the electric motor, i.e. the upper power limit thereof, as a result of which possible different driving performances of the hybrid vehicle become transparent and comprehensible to the driver.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
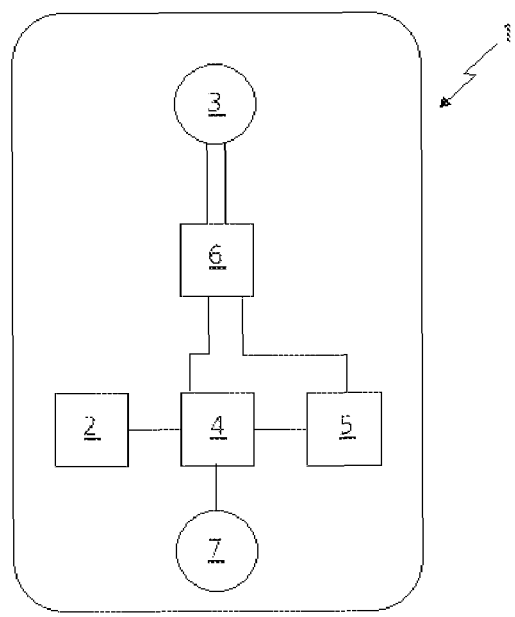
FIG. 1 shows a very schematic illustration of a hybrid vehicle.

Reference will now be made in detail to the preferred embodiments of the present invention, examples of which are illustrated in the accompanying drawings, wherein like reference numerals refer to like elements throughout.

FIG. 1 shows a very schematic illustration of a hybrid vehicle 1 which has, for its drive, an internal combustion engine 2 and an electric motor 3. Basically, it would also be possible to provide more than the one electric motor 3. In the present case, the internal combustion engine 2 is connected to a battery 5 via an engine control device 4. The engine control device 4 and the battery 5 are in turn connected to power electronics 6 which serve to control the electric motor 3 and are connected thereto in a manner known per se. In the present case, a device 7 for displaying information of the hybrid vehicle 1 is also connected to the engine control device 4. The device 7 is preferably located in a passenger compartment of the hybrid vehicle 1, for example in the region of an instrument panel. The design of the hybrid vehicle 1 which is illustrated in FIG. 1 is to be considered as purely exemplary, and the device 7, which is described in detail below, could also be used in hybrid vehicles which are designed in other ways.

The device 7 has a display instrument 8 which is illustrated in various embodiments in FIGS. 2, 3, 4 and 5. In the embodiment of the display instrument 8 according to FIG. 2, the latter is divided into a total of four zones which are denoted by the reference symbols 9, 10, 11 and 12 in the clockwise direction. There is a first zone 9, in which, in the present case, charging of the battery 5 is displayed, a second zone 10 in which it is displayed that the hybrid vehicle 1 can be or is operated with the electric motor 3, a third zone 11 which displays the operation of the internal combustion engine 2 together with the electric motor 3, and a fourth zone 12 which displays what is referred to as a boost mode of the electric motor 3, which can also be referred to as operation with increased load. Furthermore, the display instrument 8 has a pointer 13 which is in the fourth zone 12 in the present operating state of the hybrid vehicle 1. Accordingly, in the illustrated operating state the electric motor 3 is operated in the boost mode in which the electric motor 3 can output additional power. Since a maximum power is called in the boost mode, in this context the internal combustion engine 2 is also operated. The boost mode can, for example, be triggered by a kickdown, i.e. complete depression of the gas pedal. To this extent, the display instrument can be one which is known per se such as is used, for example, in the hybrid vehicle which is supplied under the designation "Q5 hybrid" by the applicant.

Figure 2:
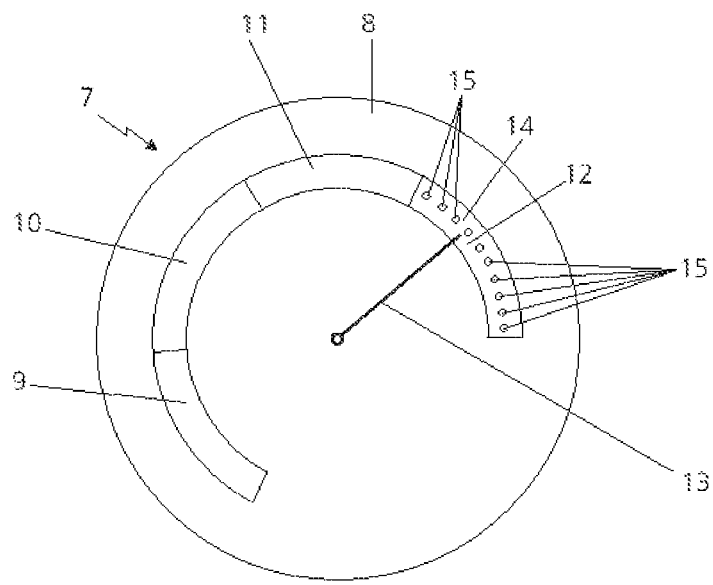
FIG. 2 shows a first embodiment of a display instrument of the proposed device.

In addition, the display instrument 8 has according to FIG. 2 a zone 14 in which the remaining time in which the electric motor 3 can be operated in the boost mode is displayed. In the present case, the zone 14 in which the remaining time can be displayed is within the fourth zone 12 in which the power can be displayed during the boost mode of the electric motor 3. In the case of the exemplary embodiment illustrated in FIG. 2, the remaining time in which the electric motor 3 can be operated in the boost mode is displayed by a plurality of light elements 15 which can be embodied, for example, as LEDs. In this context, the remaining time in which the electric motor 3 can be operated in the boost mode is therefore longer, the greater the number of light elements 15 which are switched on or lit. During the boost mode of the electric motor 3, the light elements 15 therefore gradually go out until the last light element 15 has gone out, as a result of which it is indicated to the driver of the hybrid vehicle 1 that the boost mode of the electric motor 3 is now ended. In this context, firstly the light elements 15 furthest away from the third zone 11 go out, with the result that the last still lit light element 15 is the one which is located directly next to the third zone 11.

As an alternative to the embodiment in FIG. 2, the zone 14 in which the remaining time in which the electric motor 3 can be operated in the boost mode is displayed could also be located parallel to and, for example, outside the fourth zone 12. In this case, the zone 14 could preferably have in turn the light elements 15.

Figure 3:
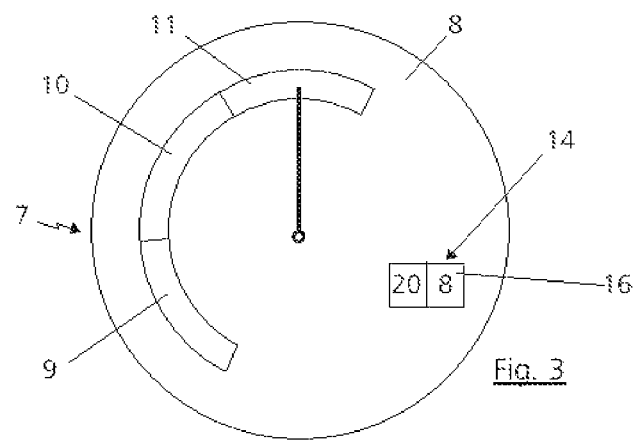
FIG. 3 shows a second embodiment of a display instrument of the proposed device.

In the case of the embodiment of the display instrument 8 illustrated in FIG. 3, the zone 14 in which the remaining time in which the electric motor 3 can be operated in the boost mode is displayed is embodied by a numerical display 16 and is therefore embodied separately from the zone 12 in which the power of the electric motor 3 which can be produced in the boost mode can be displayed. In the present case, the remaining time is displayed in seconds. The numerical display 16 can additionally be divided, wherein in the present case the remaining time is displayed in the right-hand half, and the power which is additionally available as a result of the boost mode of the electric motor 3 is displayed in kW in the left-hand half. If appropriate, it is also possible here, as provided in the exemplary embodiment, to dispense with the fourth zone 12 or for the latter to be formed by the left half of the numerical display 16.

Figure 4:
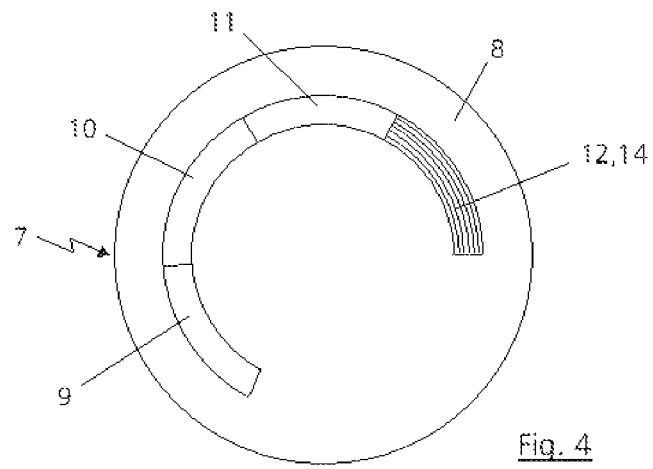
FIG. 4 shows a third embodiment of a display instrument of the proposed device.
Figure 5:
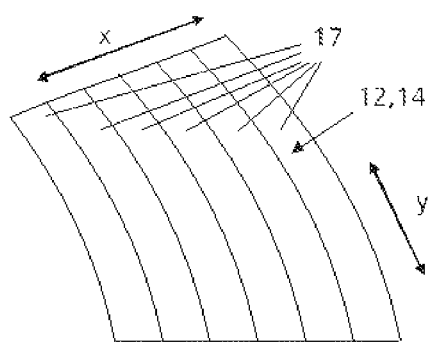
FIG. 5 shows an enlarged illustration of part of the display instrument from FIG. 4.

A further embodiment of the display instrument 8 is illustrated in FIGS. 4 and 5. Here, the fourth zone 12 and the zone 14 in which the remaining time in which the electric motor 3 can be operated in the boost mode can be displayed are identical, or the zone 14 in which the remaining time is displayed is in the zone 12 in which the power which can be produced by the electric motor 3 in the boost mode is displayed.

As is apparent from the enlarged illustration of FIG. 5, the entire zone denoted by the reference symbols 12 and 14 has a light element 17 which indicates, in a direction denoted by "x", the power of the electric motor 3 which can be produced in the boost mode, and in a direction denoted by "y" the remaining time in which the electric motor 3 can be operated in the boost mode. In the present case, six light elements 17 are arranged in parallel one next to the other in a purely exemplary fashion, wherein in the illustrated exemplary embodiment the power decreases as a result of the light elements 17 going out from right to left, and the decreasing time as a result of the light elements 17 going out from bottom to top, that is to say in the direction of the end of the fourth zone 12 or of the zone 14 adjoining the third zone 11. The light elements 17 are preferably an LCD field.

Furthermore, in the present case it is provided (in a way which is not illustrated) that the power which is displayed in the fourth zone 12 and which can be produced by the electric motor 3 in the boost mode is displayed as a function of a temperature of the battery 5 which is connected to the electric motor 3. In this context, the engine control device 4 preferably calculates, if appropriate together with the power electronics 6, the power which can actually be produced by the electric motor 3 if the latter cannot produce its entire power owing, for example, to excessively low battery temperatures or other restrictions, for example derating. The remaining time in which the electric motor 3 can be operated in the boost mode can also be calculated by the power electronics 6 or the engine control device 4.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV,* 69 USPQ2d 1865 (Fed. Cir. 2004).

The invention claimed is:

1. A device for displaying information in a hybrid vehicle comprising:
   a display instrument which includes a plurality of zones to display a current operating state of an internal combustion engine and an electric motor of the hybrid vehicle, wherein
   a first zone among the plurality of zones displays a power which can be produced by the electric motor in a boost mode, and
   the first zone further includes a sub-zone to display a remaining time in which the electric motor can be operated in the boost mode, while displaying in the first zone the power which can be produced by the electric motor in the boost mode.

2. The device as claimed in claim 1, wherein
   the power which can be produced by the electric motor in the boost mode is displayed using a pointer, and the remaining time is displayed using at least one light element.

3. The device as claimed in claim 2, wherein
   the pointer extends from a center of the display instrument to the first zone to indicate the power which can be produced by the electric motor in the boost mode, and
   the sub-zone includes a plurality of light elements, such that during the boost mode, an output of the plurality of light elements changes according to the remaining time.

4. The device as claimed in claim 2, wherein
   an increase in a number of light elements switched on corresponds to an increase in the remaining time, and
   as the remaining time decreases, light elements in the sub-zone are switched off sequentially.

5. The device as claimed in claim 2, wherein
   the plurality of zones are arranged in a semi-circular arc shape and include a second zone, which is disposed adjacent to the first zone,
   the sub-zone includes a plurality of light elements, and
   as the remaining time decreases, light elements in the sub-zone which are disposed furthest away from the second zone are switched off first and light elements in the sub-zone which are disposed closest to the second zone are switched off last.

6. The device as claimed in claim 1, wherein
   the power which can be produced by the electric motor in the boost mode is displayed in the first zone using a light element in a first direction, and the remaining time is displayed in the sub-zone in a second direction.

7. The device as claimed in claim 1, wherein
   the power which can be produced by the electric motor in the boost mode is displayed as a function of a temperature of a battery which is connected to the electric motor.

8. The device as claimed in claim 1, wherein
   the first zone includes a plurality of light elements arranged in parallel with one another,
   the power which can be produced by the electric motor in the boost mode is displayed in the first zone according to an output of the plurality of light elements in a first direction, and
   the remaining time is displayed in the sub-zone according to an output of the plurality of light elements in a second direction.

9. The device as claimed in claim 8, wherein
   as the power which can be produced by the electric motor in the boost mode decreases, light elements in the first direction are switched off, and
   as the remaining time decreases, light elements in the second direction are switched off.

10. The device as claimed in claim 8, wherein the light elements are formed by a liquid crystal display (LCD).

11. The device as claimed in claim 8, wherein
    the plurality of zones are arranged in a semi-circular arc shape and include a second zone, which is disposed adjacent to the first zone,
    the plurality of light elements are arranged in a concentric manner,
    as the remaining time decreases, the output of the light elements are changed in the second direction by switching off light elements which are disposed furthest away from the second zone first, and by switching off light elements which are disposed closest to the second zone last, and
    as the power which can be produced by the electric motor in the boost mode decreases, the output of the light elements are changed in the first direction by switching off light elements which are disposed furthest away from a center of the display instrument first, and by switching off light elements which are disposed closest to the center of the display instrument last.

12. The device as claimed in claim 1, wherein
    the first zone includes a plurality of arc shaped light elements arranged in parallel with one another,
    one of the remaining time and the power which can be produced by the electric motor in the boost mode is represented by changing a number of illuminated light elements, and
    another of the remaining time and the power which can be produced by the electric motor in the boost mode is represented by changing a percentage of illumination for all illuminated light elements.

13. The device as claimed in claim 1, wherein a boundary of the first zone is the same as a boundary of the subzone.

14. The device as claimed in claim 1, wherein the sub-zone in which the remaining time is displayed is arranged substantially parallel to the first zone.

15. The device as claimed in claim 14, wherein
    the power which can be produced by the electric motor in the boost mode is displayed using a pointer, and the remaining time is displayed using at least one light element.

16. The device as claimed in claim 14, wherein
    the power which can be produced by the electric motor in the boost mode is displayed in the first zone using a light element in a first direction, and the remaining time is displayed in the sub-zone in a second direction.

17. The device as claimed in claim 14, wherein
    the power which can be produced by the electric motor in the boost mode is displayed as a function of a temperature of a battery which is connected to the electric motor.

18. The device as claimed in claim 14, wherein the sub-zone is provided within the first zone.

19. The device as claimed in claim 14, wherein
    the first zone includes a plurality of light elements arranged in parallel with one another,
    the power which can be produced by the electric motor in the boost mode is displayed in the first zone according to an output of the plurality of light elements in a first direction, and
    the remaining time is displayed in the sub-zone according to an output of the plurality of light elements in a second direction.

20. A device for displaying information in a hybrid vehicle comprising:
- a display instrument which includes a plurality of zones to display a current operating state of an internal combustion engine and an electric motor of the hybrid vehicle, wherein
- a first zone among the plurality of zones displays a power which can be produced by the electric motor in a boost mode,
- the display instrument further includes a sub-zone to display a remaining time in which the electric motor can be operated in the boost mode, and
- the sub-zone in which the remaining time is displayed is arranged substantially parallel to the first zone which displays the power which can be produced by the electric motor in the boost mode.

* * * * *